US012598217B2

(12) United States Patent
Selvaraj et al.

(10) Patent No.: US 12,598,217 B2
(45) Date of Patent: Apr. 7, 2026

(54) ANALYZING CLOUD-BASED SERVICES FOR COMPLIANCE WITH MULTIPLE REGULATIONS

(71) Applicant: Zscaler, Inc., San Jose, CA (US)

(72) Inventors: Kumaraswamy Selvaraj, San Ramon, CA (US); Michael Kuperman, Hillsborough, CA (US)

(73) Assignee: Zscaler, Inc., San Jose, CA (US)

( * ) Notice: Subject to any disclaimer, the term of this patent is extended or adjusted under 35 U.S.C. 154(b) by 51 days.

(21) Appl. No.: 18/638,944

(22) Filed: Apr. 18, 2024

(65) Prior Publication Data

US 2025/0330496 A1    Oct. 23, 2025

(51) Int. Cl.
H04L 9/40 (2022.01)
H04L 41/02 (2022.01)
(52) U.S. Cl.
CPC .............. H04L 63/20 (2013.01); H04L 41/02 (2013.01)
(58) Field of Classification Search
CPC ................................. H04L 63/20; H04L 41/02
USPC ........................................................... 726/1
See application file for complete search history.

(56) References Cited

U.S. PATENT DOCUMENTS

| | | | |
|---|---|---|---|
| 10,187,427 B2* | 1/2019 | Banerjee | H04L 63/0245 |
| 10,255,370 B2* | 4/2019 | Carpenter | H04L 41/0866 |
| 2015/0200958 A1* | 7/2015 | Muppidi | H04L 63/1433 726/23 |
| 2017/0041206 A1* | 2/2017 | Maes | H04L 63/00 |
| 2020/0304533 A1* | 9/2020 | May | H04L 63/20 |

* cited by examiner

*Primary Examiner* — Teshome Hailu
(74) *Attorney, Agent, or Firm* — Baratta Law PLLC; Lawrence A. Baratta, Jr.

(57)    ABSTRACT

Systems and methods for analyzing compliance of an online service with pre-established regulations or standards are provided herein. In one example, a method includes a step of receiving a request to perform a compliance analysis on a cloud-based service to determine whether the cloud-based service complies with multiple compliance standards applicable to an environment in which the cloud-based service is intended to operate. The method further includes a step of collecting compliance controls associated with each of the multiple compliance standards. Also, the method includes a step of automatically organizing the compliance controls to reduce the number of assessment steps. The method further includes a step of enabling implementation of one or more assessment stages using the reduced number of assessment steps to determine whether the cloud-based service complies with the multiple compliance standards.

20 Claims, 10 Drawing Sheets

| COMPLIANCE PROGRAM | AREA OF FOCUS | # OF CONTROLS | ASSESSMENT TIME (hrs) | | | |
| --- | --- | --- | --- | --- | --- | --- |
| | | | PRE-ASMT | ONSITE ASMT | POST-ASMT | TOTAL |
| AICPA SOC | Security, Availability, and Confidentiality | 186 | 93 | 60 | 25 | 178 |
| ISO 27001 | Information Security Management Systems | 171 | 55 | 35 | 15 | 105 |
| ISO 27018 | Privacy in the Cloud Controls | 36 | 24 | 18 | 8 | 50 |
| CSA STAR | Level 2 Certification | 354 | 75 | 65 | 30 | 170 |
| | | Total Time: | 247 | 178 | 78 | 503 |

| ASSESSMENT STAGE | CONVENTIONAL APPROACH | NEW APPROACH |
| --- | --- | --- |
| Pre-Onsite Assessment | 247 hours | 160 hours (~35% reduction) |
| Onsite Assessment | 178 hours | 105 hours (~40% reduction) |
| Post-Onsite Assessment | 78 hours | 80 hours (about the same) |

FIG. 9

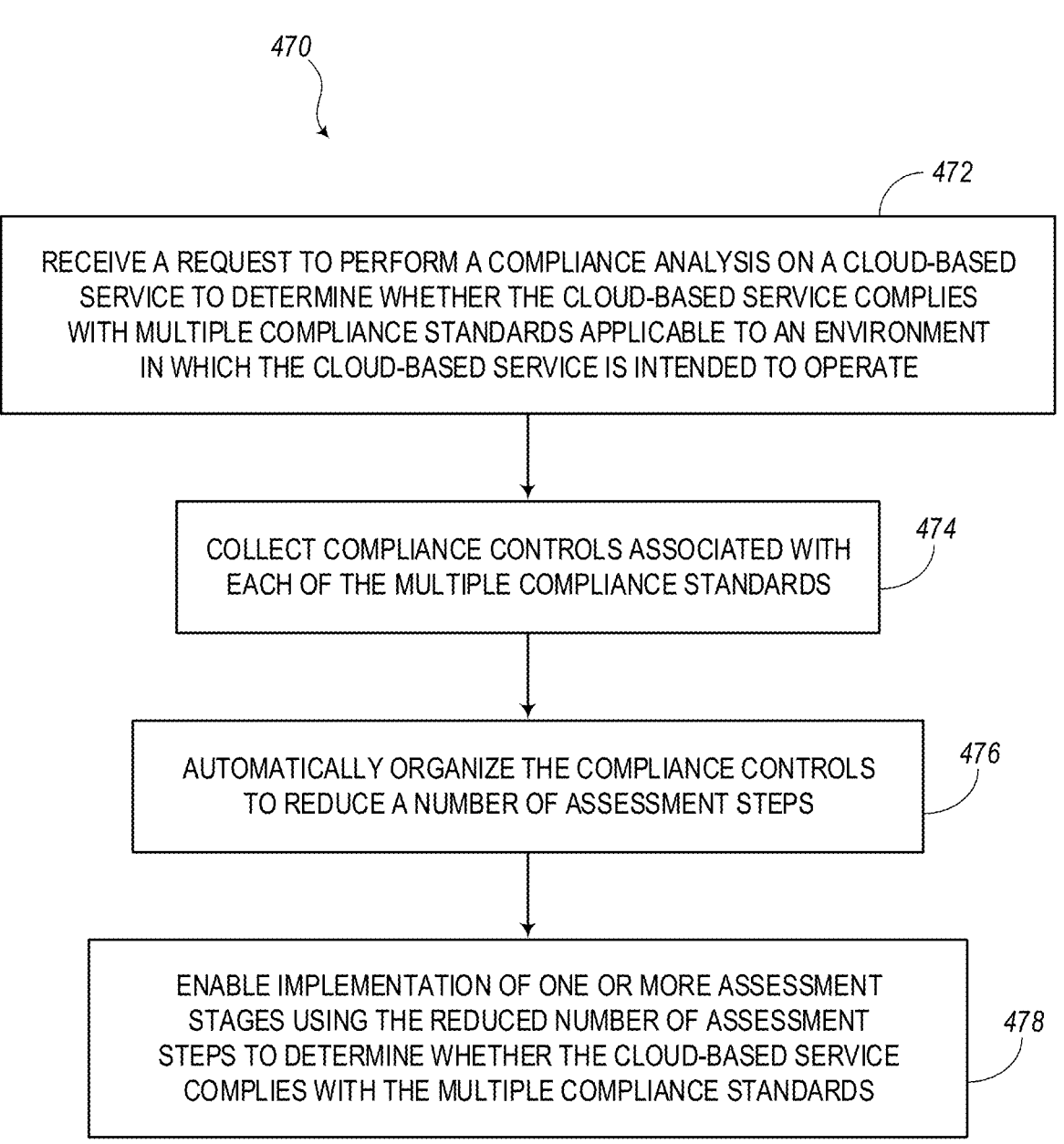

470

472

RECEIVE A REQUEST TO PERFORM A COMPLIANCE ANALYSIS ON A CLOUD-BASED SERVICE TO DETERMINE WHETHER THE CLOUD-BASED SERVICE COMPLIES WITH MULTIPLE COMPLIANCE STANDARDS APPLICABLE TO AN ENVIRONMENT IN WHICH THE CLOUD-BASED SERVICE IS INTENDED TO OPERATE

474

COLLECT COMPLIANCE CONTROLS ASSOCIATED WITH EACH OF THE MULTIPLE COMPLIANCE STANDARDS

476

AUTOMATICALLY ORGANIZE THE COMPLIANCE CONTROLS TO REDUCE A NUMBER OF ASSESSMENT STEPS

478

ENABLE IMPLEMENTATION OF ONE OR MORE ASSESSMENT STAGES USING THE REDUCED NUMBER OF ASSESSMENT STEPS TO DETERMINE WHETHER THE CLOUD-BASED SERVICE COMPLIES WITH THE MULTIPLE COMPLIANCE STANDARDS

FIG. 10

ANALYZING CLOUD-BASED SERVICES FOR COMPLIANCE WITH MULTIPLE REGULATIONS

FIELD OF THE DISCLOSURE

The present disclosure generally relates to computer networking systems and methods. More particularly, the present disclosure relates to systems and methods for analyzing cloud-based services, such as network security services, to determine if the cloud-based services are in compliance with established standards and regulations.

BACKGROUND OF THE DISCLOSURE

The traditional view of an enterprise network (i.e., corporate, private, industrial, operational, etc.) included a well-defined perimeter defended by various appliances (e.g., firewalls, intrusion prevention, advanced threat detection, etc.). In this traditional view, mobile users utilize a Virtual Private Network (VPN), etc. and have their traffic back-hauled into the well-defined perimeter. This worked when mobile users represented a small fraction of the users, i.e., most users were within the well-defined perimeter. However, this is no longer the case—the definition of the workplace is no longer confined to within the well-defined perimeter, and with applications moving to the cloud, the perimeter has extended to the Internet. This results in an increased risk for the enterprise data residing on unsecured and unmanaged devices as well as the security risks in access to the Internet. Cloud-based security solutions have emerged, such as Zscaler Internet Access (ZIA) and Zscaler Private Access (ZPA), available from Zscaler, Inc., the applicant and assignee of the present application.

ZPA is a cloud service that provides seamless, zero trust access to private applications running on the public cloud, within the data center, within an enterprise network, etc. As described herein, ZPA is referred to as zero trust access to private applications or simply a zero trust access service. Here, applications are never exposed to the Internet, making them completely invisible to unauthorized users. The service enables the applications to connect to users via inside-out connectivity versus extending the network to them. Users are never placed on the network. This Zero Trust Network Access (ZTNA) approach supports both managed and unmanaged devices and any private application (not just web apps).

BRIEF SUMMARY OF THE DISCLOSURE

The present disclosure relates to systems and methods for automatically analyzing or assessing compliance of a service or product to a plurality of standards. A method, according to one embodiment, includes a step of receiving a request to perform a compliance analysis on a cloud-based service to determine whether the cloud-based service complies with multiple compliance standards applicable to an environment in which the cloud-based service is intended to operate. The method further includes the step of collecting compliance controls associated with each of the multiple compliance standards. Also, the method is configured to automatically organize the compliance controls to reduce the number of assessment steps. The method further includes enabling implementation of one or more assessment stages using the reduced number of assessment steps to determine whether the cloud-based service complies with the multiple compliance standards.

For example, the step of automatically organizing the compliance controls may include a) recognizing similarities or equivalents among one or more different compliance controls, b) analyzing similar language among one or more different compliance controls, c) removing redundancies in the compliance controls, d) combining, grouping, or consolidating similar compliance controls, and/or e) rearranging an order of the compliance controls in a logical sequence to simplify the overall compliance process.

The method may also include additional steps according to other embodiments. For example, the method may further comprise the step of pre-populating a database with the compliance controls associated with each of the multiple compliance standards. The method may also retrieve data associated with a new compliance standard and store new compliance controls of the new compliance standard in the database. For example, the one or more assessment stages may include a) a pre-onsite assessment, b) an onsite assessment, and c) a post-onsite assessment.

The method may also include the step of creating a report that includes results of the compliance analysis. The report, for instance, may include a) a certification, b) a document explaining results of the compliance analysis, and/or c) a document providing details showing evidence of compliance to the compliance controls. The cloud-based service described herein may be a network security service. The compliance standards may be related to industry standards, federal government standards, and/or state government standards. Also, the method may further include the step of selecting the multiple compliance standards based on one or more specific geographical areas where a service provider of the cloud-based service is intended to do business.

BRIEF DESCRIPTION OF THE DRAWINGS

The present disclosure is illustrated and described herein with reference to the various drawings, in which like reference numbers are used to denote like system components/method steps, as appropriate, and in which:

FIG. 1C is a logical diagram illustrating zero trust policies with the cloud-based system and a comparison with the conventional firewall-based approach.

FIG. 3 is a block diagram of a server, which may be used in the cloud-based system, in other systems, or standalone.

FIG. 4 is a block diagram of a user device, which may be used with the cloud-based system or the like.

FIG. 8 is a table showing details of performing compliance analysis using conventional strategies.

FIG. 9 is a table that compares the conventional procedures with the systems and methods described in the present disclosure.

FIG. 10 is a flow diagram illustrating an embodiment of a method 470 for performing automated compliance analysis.

DETAILED DESCRIPTION OF THE DISCLOSURE

Again, the present disclosure relates to systems and methods for automatically analyzing, testing, or assessing compliance of an online service or product in accordance with a plurality of standards. The systems and methods may be configured to initially receive a request to perform a compliance analysis on a cloud-based service. The compliance request is intended to gain knowledge of (or obtain certification for) whether the cloud-based service complies with multiple compliance standards, particularly those standards applicable to an environment in which the cloud-based service is intended to operate. The systems and methods may be configured to collect compliance controls associated with each of the multiple compliance standards. Also, the systems and methods are configured to automatically organize the compliance controls to reduce the number of assessment steps. Implementation of one or more assessment stages may then be enabled using the reduced number of assessment steps to thereby determine whether the cloud-based service actually complies with the multiple compliance standards.

Example Cloud-Based System Architecture

Figure 1A:
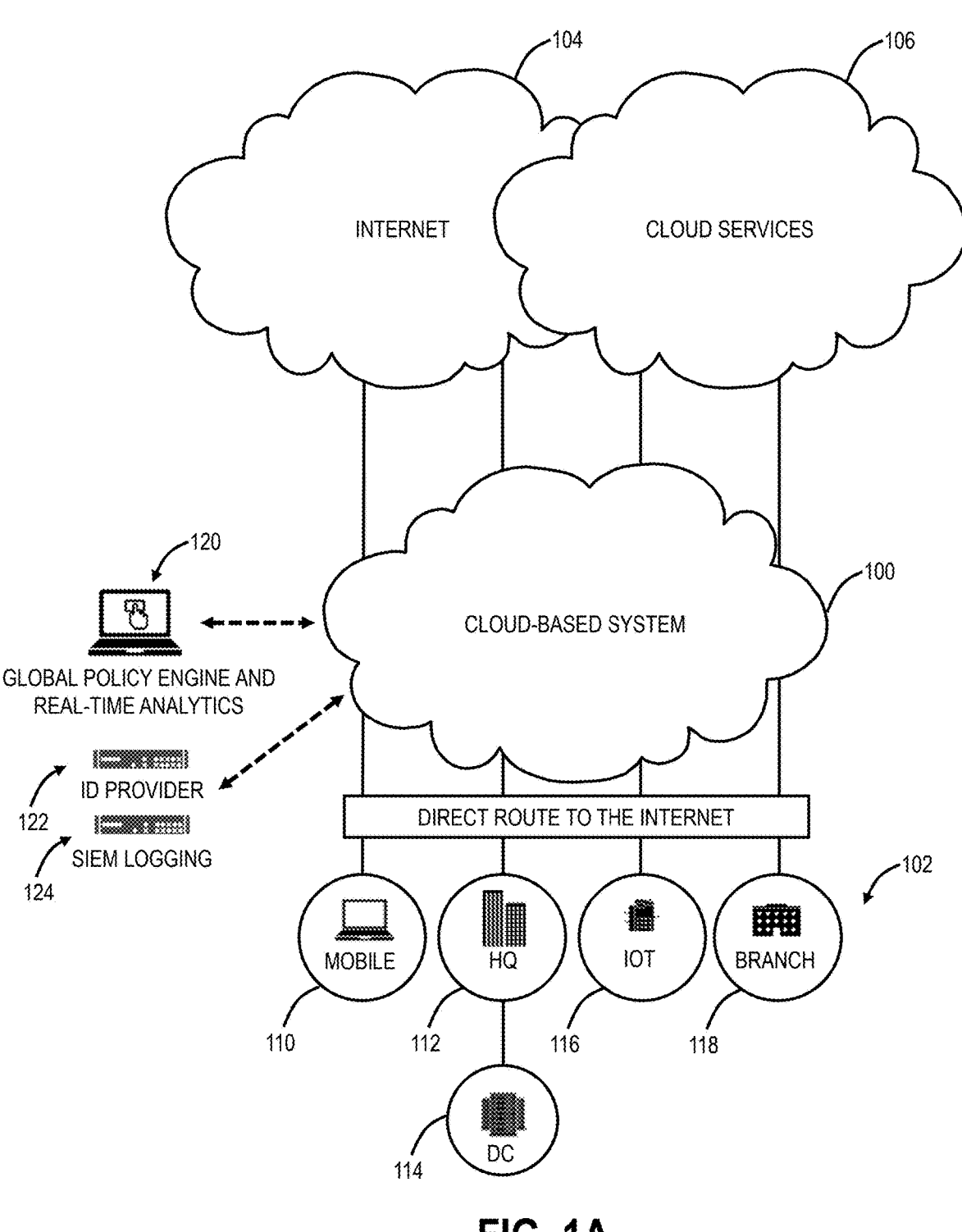
FIG. 1A is a network diagram of a cloud-based system offering security as a service.

FIG. 1A is a network diagram of a cloud-based system 100 offering security as a service. Specifically, the cloud-based system 100 can offer a Secure Internet and Web Gateway as a service to various users 102, as well as other cloud services. In this manner, the cloud-based system 100 is located between the users 102 and the Internet as well as any cloud services 106 (or applications) accessed by the users 102. As such, the cloud-based system 100 provides inline monitoring inspecting traffic between the users 102, the Internet 104, and the cloud services 106, including Secure Sockets Layer (SSL) traffic. The cloud-based system 100 can offer access control, threat prevention, data protection, etc. The access control can include a cloud-based firewall, cloud-based intrusion detection, Uniform Resource Locator (URL) filtering, bandwidth control, Domain Name System (DNS) filtering, etc. The threat prevention can include cloud-based intrusion prevention, protection against advanced threats (malware, spam, Cross-Site Scripting (XSS), phishing, etc.), cloud-based sandbox, antivirus, DNS security, etc. The data protection can include Data Loss Prevention (DLP), cloud application security such as via a Cloud Access Security Broker (CASB), file type control, etc.

The cloud-based firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The cloud-based intrusion prevention and advanced threat protection can deliver full threat protection against malicious content such as browser exploits, scripts, identified botnets and malware callbacks, etc. The cloud-based sandbox can block zero-day exploits (just identified) by analyzing unknown files for malicious behavior. Advantageously, the cloud-based system 100 is multi-tenant and can service a large volume of the users 102. As such, newly discovered threats can be promulgated throughout the cloud-based system 100 for all tenants practically instantaneously. The antivirus protection can include antivirus, antispyware, anti-malware, etc. protection for the users 102, using signatures sourced and constantly updated. The DNS security can identify and route command-and-control connections to threat detection engines for full content inspection.

The DLP can use standard and/or custom dictionaries to continuously monitor the users 102, including compressed and/or SSL-encrypted traffic. Again, being in a cloud implementation, the cloud-based system 100 can scale this monitoring with near-zero latency on the users 102. The cloud application security can include CASB functionality to discover and control user access to known and unknown cloud services 106. The file type controls enable true file type control by the user, location, destination, etc. to determine which files are allowed or not.

Figure 5:
FIG. 5 is an example of a graphical diagram showing a chart of new compliance regulations and standards that have been developed over the past several years.

For illustration purposes, the users 102 of the cloud-based system 100 can include a mobile device 110, a headquarters (HQ) 112 which can include or connect to a data center (DC) 114, Internet of Things (IoT) devices 116, a branch office/remote location 118, etc., and each includes one or more user devices (an example user device 300 is illustrated in FIG. 5). The devices 110, 116, and the locations 112, 114, 118 are shown for illustrative purposes, and those skilled in the art will recognize there are various access scenarios and other users 102 for the cloud-based system 100, all of which are contemplated herein. The users 102 can be associated with a tenant, which may include an enterprise, a corporation, an organization, etc. That is, a tenant is a group of users who share a common access with specific privileges to the cloud-based system 100, a cloud service, etc. In an embodiment, the headquarters 112 can include an enterprise's network with resources in the data center 114. The mobile device 110 can be a so-called road warrior, i.e., users that are off-site, on-the-road, etc. Those skilled in the art will recognize a user 102 has to use a corresponding user device 300 for accessing the cloud-based system 100 and the like, and the description herein may use the user 102 and/or the user device 300 interchangeably.

Further, the cloud-based system 100 can be multi-tenant, with each tenant having its own users 102 and configuration, policy, rules, etc. One advantage of the multi-tenancy and a large volume of users is the zero-day/zero-hour protection in that a new vulnerability can be detected and then instantly remediated across the entire cloud-based system 100. The same applies to policy, rule, configuration, etc. changes-they are instantly remediated across the entire cloud-based system 100. As well, new features in the cloud-based system 100 can also be rolled up simultaneously across the user base, as opposed to selective and time-consuming upgrades on every device at the locations 112, 114, 118, and the devices 110, 116.

Logically, the cloud-based system 100 can be viewed as an overlay network between users (at the locations 112, 114, 118, and the devices 110, 116) and the Internet 104 and the cloud services 106. Previously, the IT deployment model included enterprise resources and applications stored within the data center 114 (i.e., physical devices) behind a firewall (perimeter), accessible by employees, partners, contractors, etc. on-site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators. As an ever-present overlay network, the cloud-based system 100 can provide the same functions as the physical devices and/or appliances regardless of geography or location of the users 102, as well as independent of platform, operating system, network access technique, network access provider, etc.

There are various techniques to forward traffic between the users 102 at the locations 112, 114, 118, and via the devices 110, 116, and the cloud-based system 100. Typically, the locations 112, 114, 118 can use tunneling where all traffic is forward through the cloud-based system 100. For example, various tunneling protocols are contemplated, such as Generic Routing Encapsulation (GRE), Layer Two Tunneling Protocol (L2TP), Internet Protocol (IP) Security (IPsec), customized tunneling protocols, etc. The devices 110, 116, when not at one of the locations 112, 114, 118 can use a local application that forwards traffic, a proxy such as via a Proxy Auto-Config (PAC) file, and the like. An application of the local application is the application 350 described in detail herein as a connector application. A key aspect of the cloud-based system 100 is all traffic between the users 102 and the Internet 104 or the cloud services 106 is via the cloud-based system 100. As such, the cloud-based system 100 has visibility to enable various functions, all of which are performed off the user device in the cloud.

The cloud-based system 100 can also include a management system 120 for tenant access to provide global policy and configuration as well as real-time analytics. This enables IT administrators to have a unified view of user activity, threat intelligence, application usage, etc. For example, IT administrators can drill-down to a per-user level to understand events and correlate threats, to identify compromised devices, to have application visibility, and the like. The cloud-based system 100 can further include connectivity to an Identity Provider (IDP) 122 for authentication of the users 102 and to a Security Information and Event Management (SIEM) system 124 for event logging. The system 124 can provide alert and activity logs on a per-user 102 basis.

Zero Trust

Figure 1B:
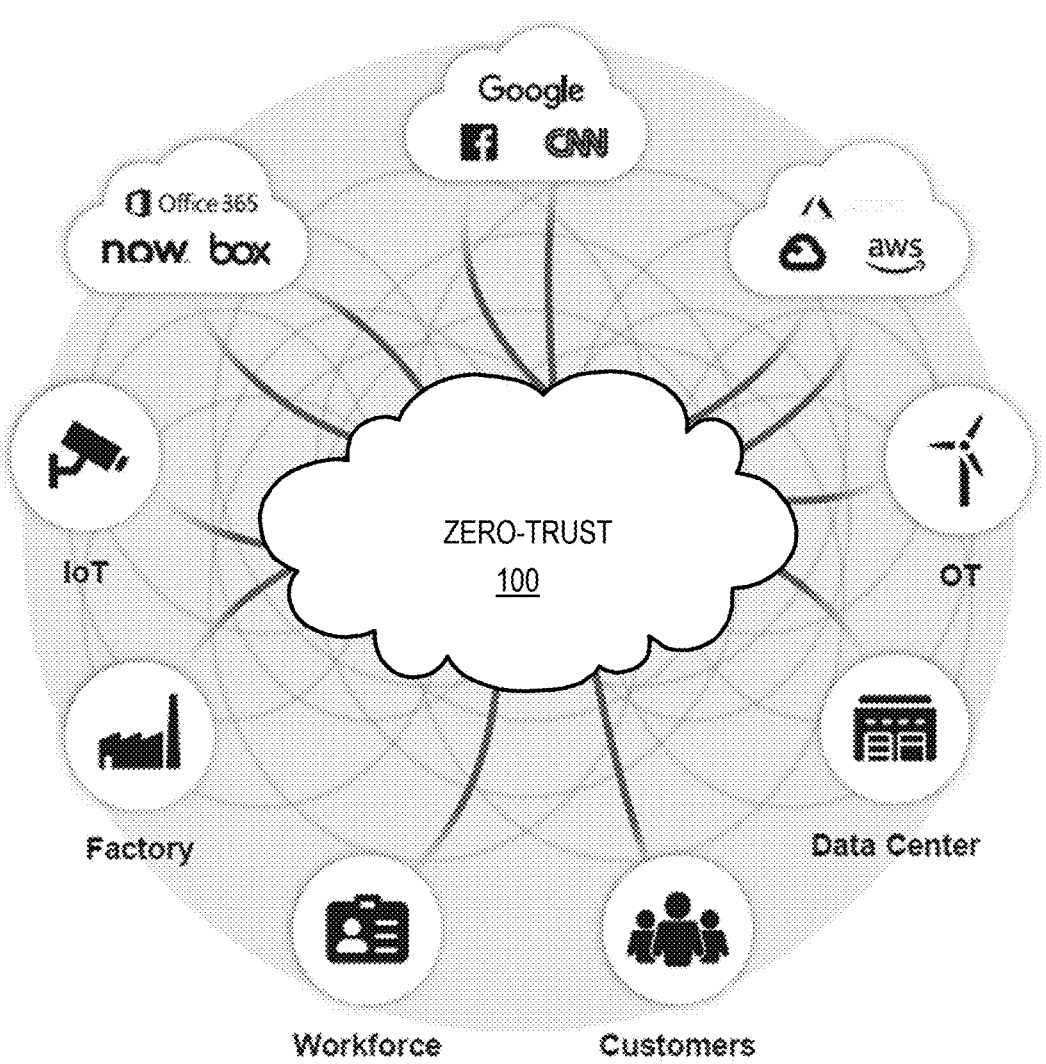
FIG. 1B is a logical diagram of the cloud-based system operating as a zero-trust platform.

FIG. 1B is a logical diagram of the cloud-based system 100 operating as a zero-trust platform. Zero trust is a framework for securing organizations in the cloud and mobile world that asserts that no user or application should be trusted by default. Following a key zero trust principle, least-privileged access, trust is established based on context (e.g., user identity and location, the security posture of the endpoint, the app or service being requested) with policy checks at each step, via the cloud-based system 100. Zero trust is a cybersecurity strategy wherein security policy is applied based on context established through least-privileged access controls and strict user authentication—not assumed trust. A well-tuned zero trust architecture leads to simpler network infrastructure, a better user experience, and improved cyberthreat defense.

Establishing a zero trust architecture requires visibility and control over the environment's users and traffic, including that which is encrypted; monitoring and verification of traffic between parts of the environment; and strong multi-factor authentication (MFA) methods beyond passwords, such as biometrics or one-time codes. This is performed via the cloud-based system 100. Critically, in a zero trust architecture, a resource's network location is not the biggest factor in its security posture anymore. Instead of rigid network segmentation, your data, workflows, services, and such are protected by software-defined microsegmentation, enabling you to keep them secure anywhere, whether in your data center or in distributed hybrid and multicloud environments.

The core concept of zero trust is simple: assume everything is hostile by default. It is a major departure from the network security model built on the centralized data center and secure network perimeter. These network architectures rely on approved IP addresses, ports, and protocols to establish access controls and validate what's trusted inside the network, generally including anybody connecting via remote access VPN. In contrast, a zero trust approach treats all traffic, even if it is already inside the perimeter, as hostile. For example, workloads are blocked from communicating until they are validated by a set of attributes, such as a fingerprint or identity. Identity-based validation policies result in stronger security that travels with the workload wherever it communicates—in a public cloud, a hybrid environment, a container, or an on-premises network architecture.

Because protection is environment-agnostic, zero trust secures applications and services even if they communicate across network environments, requiring no architectural changes or policy updates. Zero trust securely connects users, devices, and applications using business policies over any network, enabling safe digital transformation. Zero trust is about more than user identity, segmentation, and secure access. It is a strategy upon which to build a cybersecurity ecosystem.

At its core are three tenets:

Terminate every connection: Technologies like firewalls use a "passthrough" approach, inspecting files as they are delivered. If a malicious file is detected, alerts are often too late. An effective zero trust solution terminates every connection to allow an inline proxy architecture to inspect all traffic, including encrypted traffic, in real time-before it reaches its destination—to prevent ransomware, malware, and more.

Protect data using granular context-based policies: Zero trust policies verify access requests and rights based on context, including user identity, device, location, type of content, and the application being requested. Policies are adaptive, so user access privileges are continually reassessed as context changes.

Reduce risk by eliminating the attack surface: With a zero trust approach, users connect directly to the apps and resources they need, never to networks (see ZTNA). Direct user-to-app and app-to-app connections eliminate the risk of lateral movement and prevent compromised devices from infecting other resources. Plus, users and apps are invisible to the internet, so they cannot be discovered or attacked.

Figure 1C:
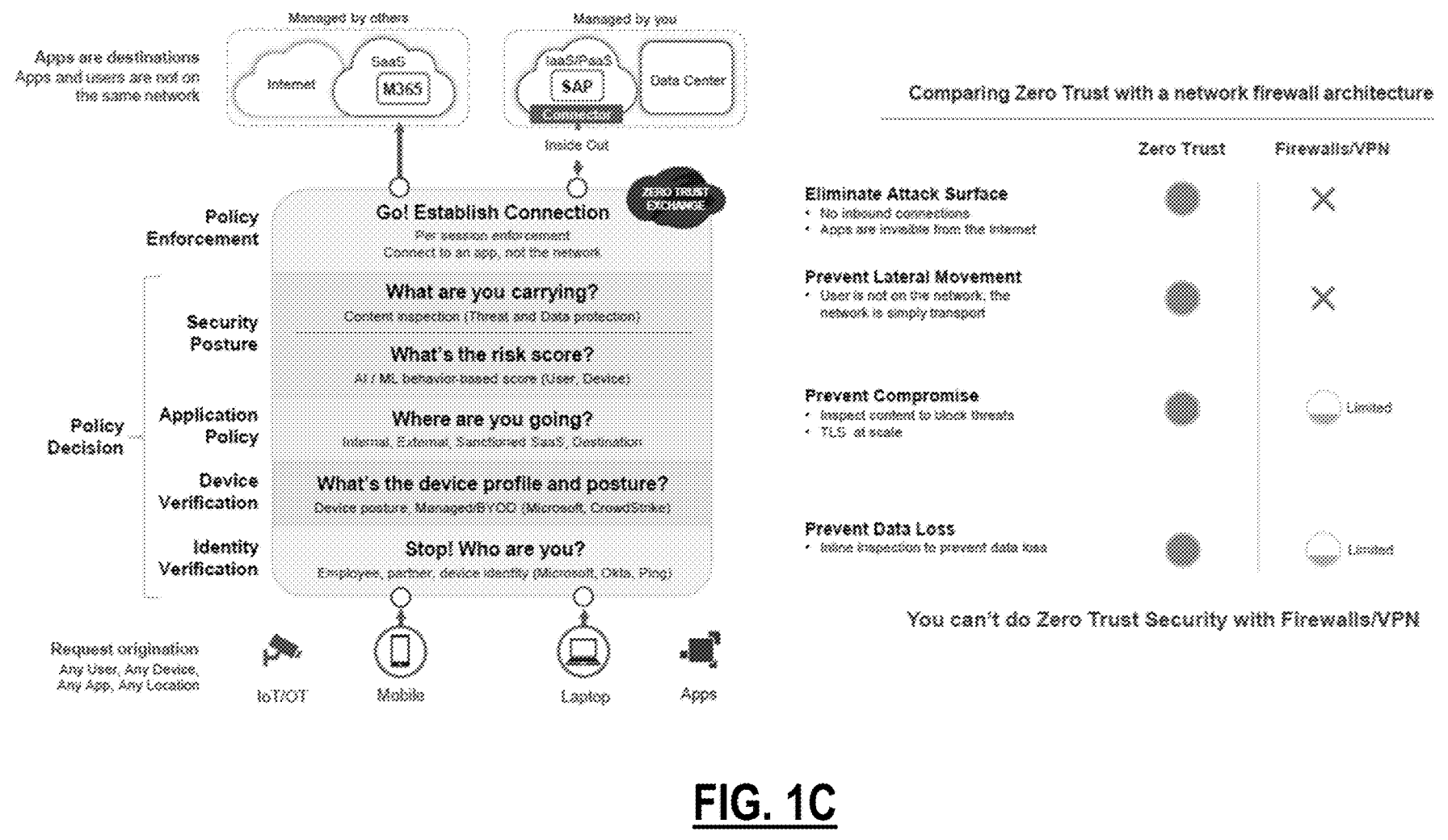

FIG. 1C is a logical diagram illustrating zero trust policies with the cloud-based system 100 and a comparison with the conventional firewall-based approach. Zero trust with the cloud-based system 100 allows per session policy decisions and enforcement regardless of the user 102 location. Unlike the conventional firewall-based approach, this eliminates attack surfaces, there are no inbound connections; prevents lateral movement, the user is not on the network; prevents compromise, allowing encrypted inspection; and prevents data loss with inline inspection.

Example Implementation of the Cloud-Based System

Figure 2:
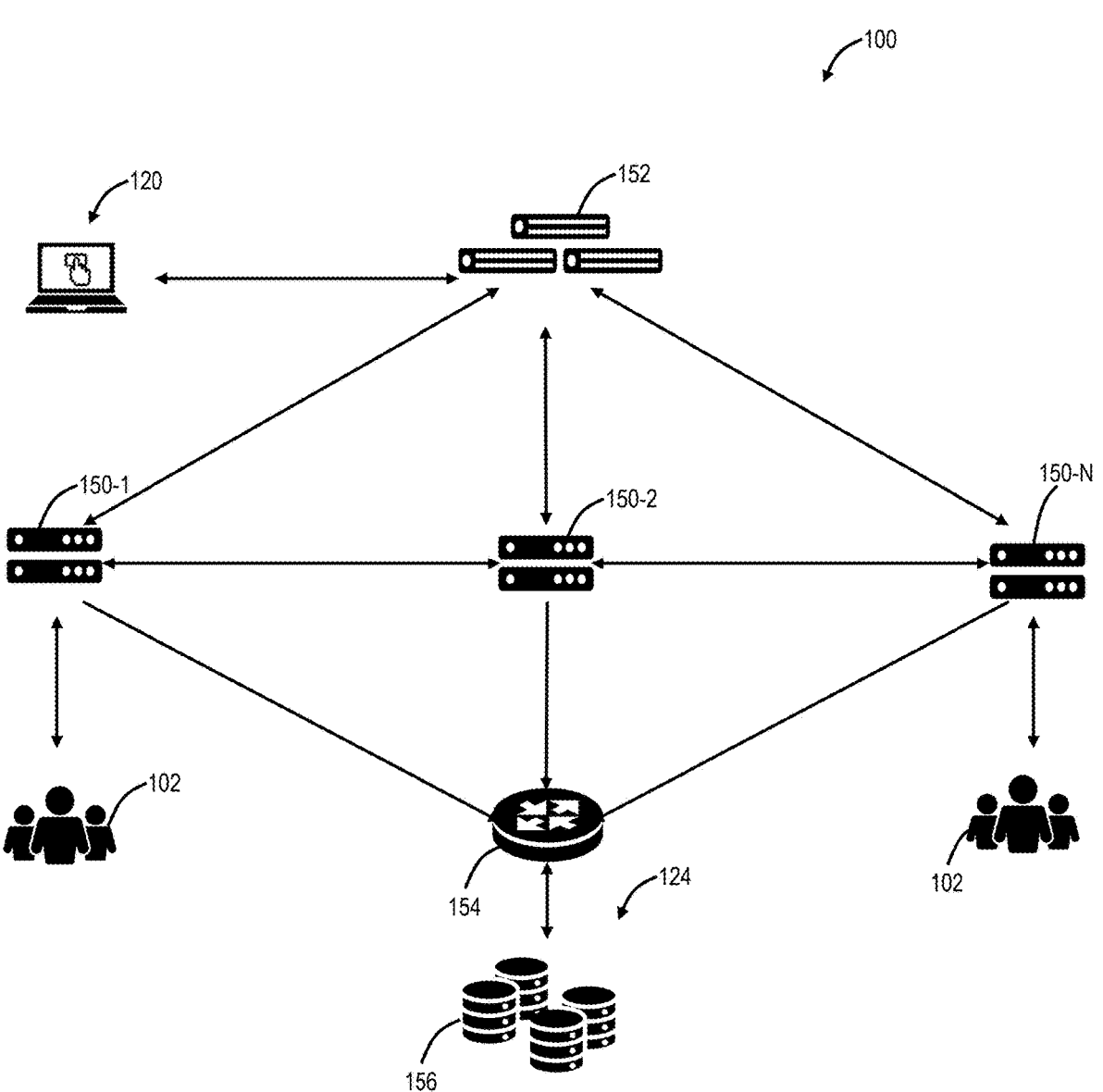
FIG. 2 is a network diagram of an example implementation of the cloud-based system.
Figures 3, 4:
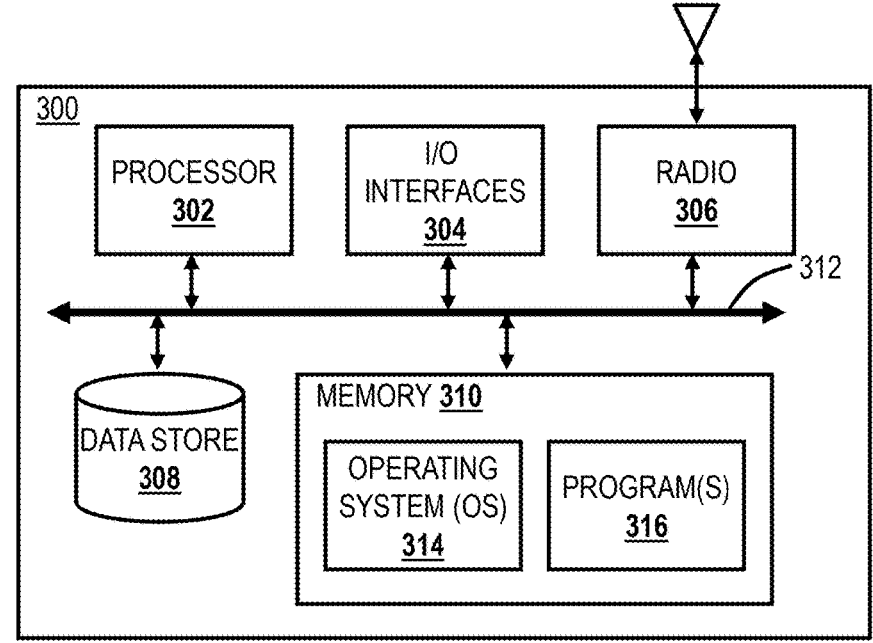

FIG. 2 is a network diagram of an example implementation of the cloud-based system 100. In an embodiment, the cloud-based system 100 includes a plurality of enforcement nodes (EN) 150, labeled as enforcement nodes 150-1, 150-2, 150-N, interconnected to one another and interconnected to a central authority (CA) 152. The nodes 150 and the central authority 152, while described as nodes, can include one or more servers, including physical servers, virtual machines (VM) executed on physical hardware, etc. An example of a server is illustrated in FIG. 4. The cloud-based system 100 further includes a log router 154 that connects to a storage cluster 156 for supporting log maintenance from the enforcement nodes 150. The central authority 152 provides centralized policy, real-time threat updates, etc. and coordinates the distribution of this data between the enforcement nodes 150. The enforcement nodes 150 provide an onramp to the users 102 and are configured to execute policy, based on the central authority 152, for each user 102. The enforcement nodes 150 can be geographically distributed, and the policy for each user 102 follows that user 102 as he or she connects to the nearest (or other criteria) enforcement node 150.

Of note, the cloud-based system 100 is an external system meaning it is separate from tenant's private networks (enterprise networks) as well as from networks associated with the devices 110, 116, and locations 112, 118. Also, of note, the present disclosure describes a private enforcement node 150P that is both part of the cloud-based system 100 and part of a private network. Further, of note, the enforcement node described herein may simply be referred to as a node or cloud node. Also, the terminology enforcement node 150 is used in the context of the cloud-based system 100 providing cloud-based security. In the context of secure, private application access, the enforcement node 150 can also be referred to as a service edge or service edge node. Also, a service edge node 150 can be a public service edge node (part of the cloud-based system 100) separate from an enterprise network or a private service edge node (still part of the cloud-based system 100) but hosted either within an enterprise network, in a data center 114, in a branch office 118, etc. Further, the term nodes as used herein with respect to the cloud-based system 100 (including enforcement nodes, service edge nodes, etc.) can be one or more servers, including physical servers, virtual machines (VM) executed on physical hardware, etc., as described above. The service edge node 150 can also be a Secure Access Service Edge (SASE).

The enforcement nodes 150 are full-featured secure internet gateways that provide integrated internet security. They inspect all web traffic bi-directionally for malware and enforce security, compliance, and firewall policies, as described herein, as well as various additional functionality. In an embodiment, each enforcement node 150 has two main modules for inspecting traffic and applying policies: a web module and a firewall module. The enforcement nodes 150 are deployed around the world and can handle hundreds of thousands of concurrent users with millions of concurrent sessions. Because of this, regardless of where the users 102 are, they can access the Internet 104 from any device, and the enforcement nodes 150 protect the traffic and apply corporate policies. The enforcement nodes 150 can implement various inspection engines therein, and optionally, send sandboxing to another system. The enforcement nodes 150 include significant fault tolerance capabilities, such as deployment in active-active mode to ensure availability and redundancy as well as continuous monitoring.

In an embodiment, customer traffic is not passed to any other component within the cloud-based system 100, and the enforcement nodes 150 can be configured never to store any data to disk. Packet data is held in memory for inspection and then, based on policy, is either forwarded or dropped. Log data generated for every transaction is compressed, tokenized, and exported over secure Transport Layer Security (TLS) connections to the log routers 154 that direct the logs to the storage cluster 156, hosted in the appropriate geographical region, for each organization. In an embodiment, all data destined for or received from the Internet is processed through one of the enforcement nodes 150. In another embodiment, specific data specified by each tenant, e.g., only email, only executable files, etc., is processed through one of the enforcement nodes 150.

Each of the enforcement nodes 150 may generate a decision vector $D=[d1, d2, \ldots, dn]$ for a content item of one or more parts $C=[c1, c2, \ldots, cm]$. Each decision vector may identify a threat classification, e.g., clean, spyware, malware, undesirable content, innocuous, spam email, unknown, etc. For example, the output of each element of the decision vector D may be based on the output of one or more data inspection engines. In an embodiment, the threat classification may be reduced to a subset of categories, e.g., violating, non-violating, neutral, unknown. Based on the subset classification, the enforcement node 150 may allow the distribution of the content item, preclude distribution of the content item, allow distribution of the content item after a cleaning process, or perform threat detection on the content item. In an embodiment, the actions taken by one of the enforcement nodes 150 may be determinative on the threat classification of the content item and on a security policy of the tenant to which the content item is being sent from or from which the content item is being requested. A content item is violating if, for any part $C=[c1, c2, \ldots, cm]$ of the content item, at any of the enforcement nodes 150, any one of the data inspection engines generates an output that results in a classification of "violating."

The central authority 152 hosts all customer (tenant) policy and configuration settings. It monitors the cloud and provides a central location for software and database updates and threat intelligence. Given the multi-tenant architecture, the central authority 152 is redundant and backed up in multiple different data centers. The enforcement nodes 150 establish persistent connections to the central authority 152 to download all policy configurations. When a new user connects to an enforcement node 150, a policy request is sent to the central authority 152 through this connection. The central authority 152 then calculates the policies that apply to that user 102 and sends the policy to the enforcement node 150 as a highly compressed bitmap.

The policy can be tenant-specific and can include access privileges for users, websites and/or content that is disallowed, restricted domains, DLP dictionaries, etc. Once downloaded, a tenant's policy is cached until a policy change is made in the management system 120. The policy can be tenant-specific and can include access privileges for users, websites and/or content that is disallowed, restricted domains, DLP dictionaries, etc. When this happens, all of the cached policies are purged, and the enforcement nodes 150 request the new policy when the user 102 next makes a request. In an embodiment, the enforcement node 150 exchange "heartbeats" periodically, so all enforcement nodes 150 are informed when there is a policy change. Any enforcement node 150 can then pull the change in policy when it sees a new request.

The cloud-based system 100 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud-based system 100 is illustrated herein as an example embodiment of a cloud-based system, and other implementations are also contemplated.

As described herein, the terms cloud services and cloud applications may be used interchangeably. The cloud service 106 is any service made available to users on-demand via the Internet, as opposed to being provided from a company's on-premises servers. A cloud application, or cloud app, is a software program where cloud-based and local components work together. The cloud-based system 100 can be utilized to provide example cloud services, including Zscaler Internet Access (ZIA), Zscaler Private Access (ZPA), Zscaler Posture Control (ZPC), and Zscaler Digital Experience (ZDX), all from Zscaler, Inc. (the assignee and applicant of the present application). Also, there can be multiple different cloud-based systems 100, including ones with different architectures and multiple cloud services. The ZIA service can provide the access control, threat prevention, and data protection described above with reference to the cloud-based system 100. ZPA can include access control, microservice segmentation, etc. The ZDX service can provide monitoring of user experience, e.g., Quality of Experience (QoE), Quality of Service (QOS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). ZPC is a Cloud-Native Application Protection Platform (CNAPP) which is a new category of security products, encompassing the functionality previously found in Cloud Security Posture Management (CSPM) and Cloud Workload Protection Platform (CWPP) products and more. Those of ordinary skill in the art will recognize various other types of cloud services 106 are also contemplated. Also, other types of cloud architectures are also contemplated, with the cloud-based system 100 presented for illustration purposes.

Example Server Architecture

FIG. 3 is a block diagram of a server 200, which may be used in the cloud-based system 100, in other systems, or standalone. For example, the enforcement nodes 150 and the central authority 152 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 3 depicts the server 200 in an oversimplified manner, and a practical embodiment may include additional components and suitably configured processing logic to support known or conventional operating features that are not described in detail herein. The components (202, 204, 206, 208, and 210)

are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Example User Device Architecture

FIG. 4 is a block diagram of a user device 300, which may be used with the cloud-based system 100 or the like. Specifically, the user device 300 can form a device used by one of the users 102, and this may include common devices such as laptops, smartphones, tablets, netbooks, personal digital assistants, MP3 players, cell phones, e-book readers, IoT devices, servers, desktops, printers, televisions, streaming media devices, and the like. The user device 300 can be a digital device that, in terms of hardware architecture, generally includes a processor 302, I/O interfaces 304, a network interface 306, a data store 308, and memory 310. It should be appreciated by those of ordinary skill in the art that FIG. 4 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100.

Compliance Analysis

In the past, companies sold software products, usually packaged as physical devices, to customers. IT professionals could physically handle these products, test them in the lab, and manage them for the customers. Currently, however, software companies often use a different paradigm in which software products (e.g., network security programs) operate in the cloud, but can still offer needed services for the customers connected to the cloud. Many customers (e.g., enterprises, companies, government agencies, etc.) do not often purchase physical products, not instead pay for services. In fact, customers are usually not allowed access to the data centers where these cloud-based services are hosted (e.g., in the cloud-based system 100 described above).

Various compliance programs seek to ensure that these services or products are aligned and certified against recognized government and commercial standards. It should be noted that these standards (or other regulations, laws, etc.) may be enacted within a local or regional jurisdiction, a state level, national level, or even internationally. These standards or regulations provide a framework to build customers' confidence by providing pertinent solutions for compliance. Also, the standards and regulations may include industry standards, US government standards, foreign government standards, private organizational standards, etc.

Compliance may typically be analyzed by a third party company. For example, a third party company may be tasked with determining compliance of online network security services (e.g., such as those provided by Zscaler). A service may be tested with respect to a single compliance standard (e.g., Health Insurance Portability and Accountability Act (HIPAA), Cloud Security Alliance (CSA), etc.). The compliance test is usually designed to test a number of factors (e.g., controls) and obtain evidence as to whether or not the product or service complies with each of those factors. After analysis, which can take several weeks or months, the compliance testing company can then create a report to notify the service provider of the results. The report can also include a certification if the service is compliant to the specific standard.

One problem with the conventional strategy, however, is that compliance certification is complex and time consuming. The compliance testing company may have a large team of employees working together to analyze the compliance of one service (or product) with respect to one standard. Also, in many cases, it may be desired that the service be analyzed with respect to compliance of more than just one standard. When testing for compliance with multiple standards, there can be many redundant actions. For example, for each standard, the conventional approach is for the compliance team to get the list of factors (e.g., controls) and gather all of the information from scratch for that one standard and then start again from scratch for the next standard, and so on. Of course, this can result in a significant waste of time and man power. Conventionally, responding to a new compliance request can take months or even more than a year, which can delay sales processes and affect a company's marketability, particularly if certification is important, such as in the case of offering network security solutions to multiple companies. Therefore, there is a need to provide systems and methods that can optimize the compliance checking processes in the field of online services. The present disclosure offers solutions in this regard for reducing wasted time and resources in the analysis of compliance of a product or service with multiple standards.

FIG. 5 is an example of a graphical diagram showing a chart 400 of new compliance regulations and standards that have been developed over the past several years. The chart 400 in this example shows US federal standards and regulations (e.g., Voluntary Product Accessibility Template (VPAT) 508, the Federal Risk and Authorization Management Program (FedRAMP), International Traffic in Arms Regulations (ITAR) Personnel Screening, among others). Also, several commercial standards have also been developed, such as the Information Security Management System (ISMS), the American Institute of Certified Public Accountants (AICPA) System and Organization Controls (SOC) 2, the Cloud Security Alliance (CSA) Security Trust Assurance and Risk (STAR), among others. The chart 400 shows a certain global compliance program, which may include the extensive process of ensuring compliance to each of the standards and regulations in place today as well as new compliance standards enacted in the future. All certifications and authorizations may go through periodic external assessments.

Figure 6:
FIG. 6 is a map showing an example of compliance regulations and standards applicable in multiple locations throughout the world.

FIG. 6 is a map 410 showing an example of compliance regulations and standards applicable in multiple locations throughout the world. From the map 410, it may be noted that compliance to certain standards and regulations may include determining the location of a business's operations and ensuring that the business complies with applicable standards, rules, laws, etc. within the various jurisdictions. Ideally, a global company might wish to obtain certification of compliance with all applicable standards relevant in all locations throughout the world, thereby allowing the company to legally operate throughout the world.

Compliance Analyzing System

Figure 7:
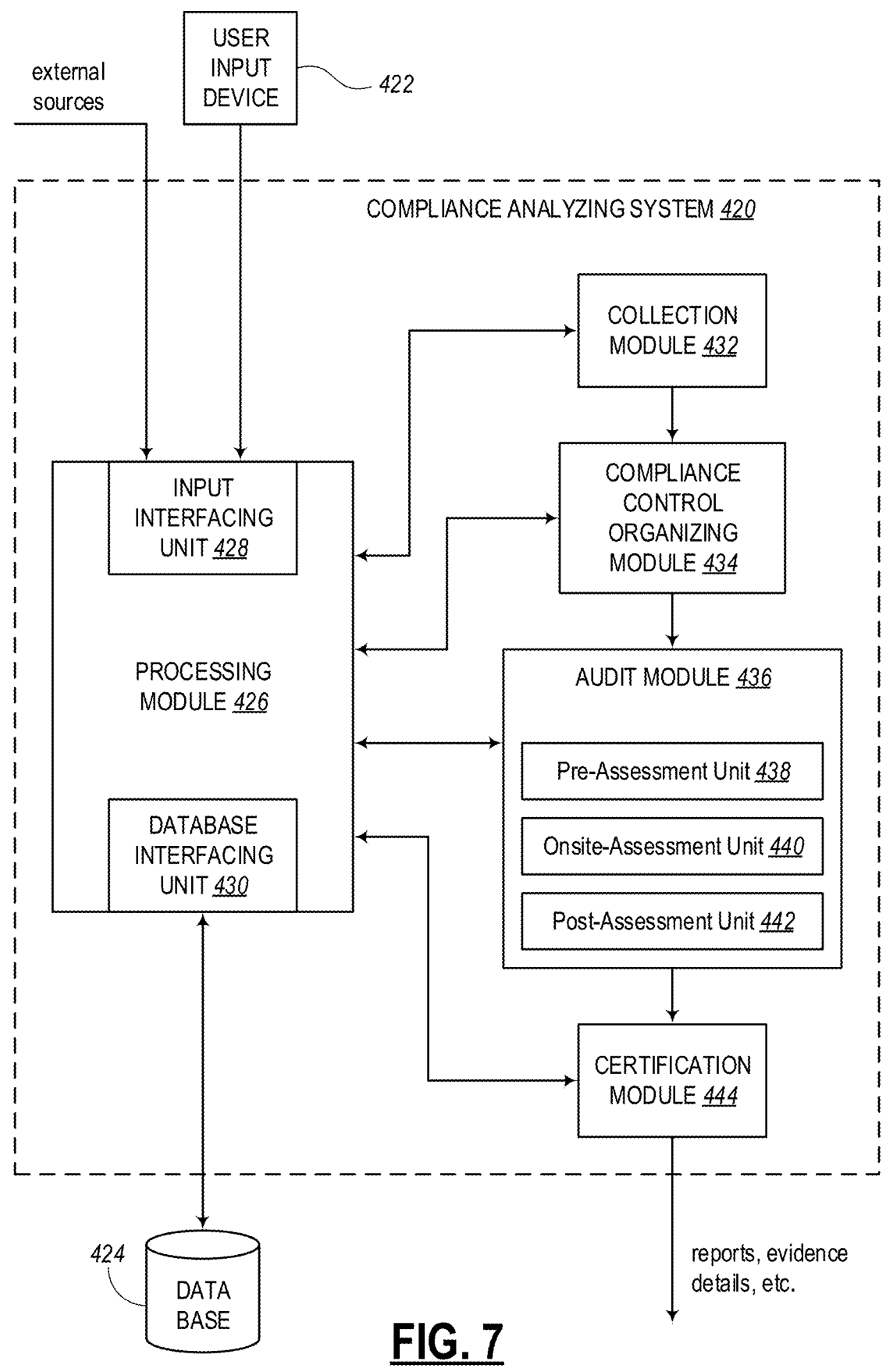
FIG. 7 is a block diagram illustrating an embodiment of a compliance analyzing system.

FIG. 7 is a block diagram illustrating an embodiment of a compliance analyzing system 420. In some embodiments, the compliance analyzing system 420 may be part of or incorporated within the server 200 of FIG. 3 or other cloud-based service device or system. According to various embodiments, the compliance analyzing system 420 may be implemented in hardware (e.g., within the processor 202)

and/or may be implemented in software or firmware (e.g., within the memory 210 or other suitable non-transitory computer-readable media). For example, the compliance analyzing system 420 may be part of one or more of the program(s) 216 shown in FIG. 4 and stored in memory 210.

The compliance analyzing system 420 may be configured to receive input from a user input device 422 and/or other external sources. Also, the compliance analyzing system 420 may utilize a database 424 (e.g., data store 208) for storing compliance request information, compliance standards and regulations, updated or renewed compliance information, compliance reports, evidence used for proving compliance, etc. In addition, the compliance analyzing system 420 may be configured to provide output, such as compliance reports, evidence details, etc. to a user, administrator, etc. for conveying the results of a compliance analysis.

As illustrated in the embodiment of FIG. 7, the compliance analyzing system 420 includes a processing module 426 for controlling the operations of other modules as described herein. In some embodiments, the processing module 426 may utilize Machine Learning (ML) or other Artificial Intelligence (AI) techniques. The processing module 426 may include an input interfacing unit 428 configured to interface or communicate with the user input device 422 or other external sources for receiving a request to perform a compliance analysis, information related to new compliance standards or regulations that have been recently developed (or discovered). The request for a compliance analysis, for instance, may include information about a specific industry (e.g., network security, health insurance information, accounting, financial services, etc.), wherein the industry may be related to a certain company, enterprise, party, entity, etc. In some embodiments, the company may be a service provider and may be associated with a security product to be tested for compliance. Also, the request may include information about a specific location (e.g., jurisdiction, state, region, country, etc.) related to the company, enterprise, party, entity, etc.

Furthermore, the processing module 426 may also include a database interfacing unit 430 configured to retrieve information from the database 424 and/or to store information in the database 424. During execution of various procedures associated with the remaining modules of the compliance analyzing system 420, the processing module 426 is configured to utilize the database interfacing unit 430 to obtain information from and/or write data to the database 424. In addition, the compliance analyzing system 420 includes a collection module 432, a compliance control organizing module 434, an audit module 436 (which may include a pre-assessment unit 438, an onsite-assessment unit 440, and a post-assessment unit 442), and a certification module 444.

The collection module 432 is configured to collect or gather compliance "controls" regarding various compliance standards and regulations currently applicable to a network. In the present disclosure, the term "control" may be defined as an element, guideline, mechanism, rule, or procedure that is intended to set certain limits with respect to regulatory aspects of a standard or regulation (e.g., a compliance standard). A control is put in place to ensure the integrity of a component to be tested in some field (e.g., testing a network security program for compliance with applicable security policies within a network). Therefore, a control may be intended to reduce certain risks that may result if a system were not complying with or supporting certain laws, regulations, standards, protocols, etc. A control may be part of a set or sub-set of other related or inter-dependent controls. A control may be established for the purpose of detecting whether a system under test complies with applicable standards and may even include corrective actions for adjusting the tested system as needed to maintain compliance. Thus, a control may also be used to promote accountability and to prevent fraud, non-compliance, abuse, waste, or other types of risks.

In particular, the collection module 432 may be configured to retrieve information related to any number of applicable regulations or standards. Each regulation or standard may include dozens, or even hundreds, of controls. According to one example, the Cloud Security Alliance (CSA) includes a protocol referred to as the Security Trust and Assurance Registry (STAR), which may be used for testing information security in a network. The CSA STAR analysis may be configured to test a set of various aspects of Data Center Security, whereby each aspect in this set is related to a control that defines a guideline in a data center. The Data Center Security controls of the CSA STAR, according to this example, may include:

| Control ID | Control Area | Specification |
|---|---|---|
| DCS-01 | Off-Site Equipment Disposal Policy and Procedures | Establish, document, approve, communicate, apply, evaluate, and maintain policies and procedures for the secure disposal of equipment used outside the organization's premises. If the equipment is not physically destroyed a data destruction procedure that renders recovery of information impossible must be applied. Review and update the policies and procedures at least annually. |
| DCS-02 | Off-Site Transfer Authorization Policy and Procedures | Establish, document, approve, communicate, apply, evaluate, and maintain policies and procedures for the relocation or transfer of hardware, software, or data/information to an offsite or alternate location. The relocation or transfer request requires the written or cryptographically verifiable authorization. Review and update the policies and procedures at least annually. |
| DCS-03 | Secure Area Policy and Procedures | Establish, document, approve, communicate, apply, evaluate, and maintain policies and procedures for maintaining a safe and secure working environment in offices, rooms, and facilities. Review and update the policies and procedures at least annually. |
| DCS-04 | Secure Media Transportation Policy and Procedures | Establish, document, approve, communicate, apply, evaluate, and maintain policies and procedures for the secure transportation of physical media. Review and update the policies and procedures at least annually. |
| DCS-05 | Assets Classification | Classify and document the physical and logical assets (e.g., applications) based on the organizational business risk. |
| DCS-06 | Assets Cataloguing and Tracking | Catalogue and track all relevant physical and logical assets located at all of the CSP's sites within a secured system. |
| DCS-07 | Controlled Access Points | Implement physical security perimeters to safeguard personnel, data, and information systems. Establish physical security perimeters between the administrative and business areas and the data storage and processing facilities areas. |
| DCS-08 | Equipment Identification | Use equipment identification as a method for connection authentication. |
| DCS-09 | Secure Area Authorization | Allow only authorized personnel access to secure areas, with all ingress and egress points restricted, documented, and monitored by physical access control mechanisms. Retain access control records on a periodic basis as deemed appropriate by the organization. |
| DCS-10 | Surveillance System | Implement, maintain, and operate datacenter surveillance systems at the external perimeter and at all the ingress and egress points to detect unauthorized ingress and egress attempts. |
| DCS-11 | Unauthorized Access Response Training | Train datacenter personnel to respond to unauthorized ingress or egress attempts |
| DCS-12 | Cabling Security | Define, implement, and evaluate processes, procedures and technical measures that ensure a risk-based protection of power and telecommunication cables from a threat of interception, interference or damage at all facilities, offices, and rooms. |
| DCS-13 | Environmental Systems | Implement and maintain data center environmental control systems that monitor, maintain and test for continual effectiveness the temperature and humidity conditions within accepted industry standards. |

-continued

| Control ID | Control Area | Specification |
|---|---|---|
| DCS-14 | Secure Utilities | Secure, monitor, maintain, and test utilities services for continual effectiveness at planned intervals. |
| DCS-15 | Equipment Location | Keep business-critical equipment away from locations subject to high probability for environmental risk events. |

In addition to the fifteen (15) Data Center Security controls (i.e., DCS-01 through DCS-15) described above, the CSA STAR policy may also include multiple other sets of controls, such as:

a) Audit and Assurance (e.g., control IDs A&A-01 through A&A-06)

b) Application and Interface Security (e.g., control IDs AIS-01 through AIS-07)

c) Business Continuity Management and Operational Resilience (e.g., control IDs BCR-01 through BCR-11)

d) Change Control and Configuration Management (e.g., control IDs CCC-01 through CCC-09)

e) Cryptography, Encryption & Key Management (e.g., control IDs CEK-01 through CEK-21)

f) Governance, Risk, and Compliance (e.g., control IDs GRC-01 through GRC-08)

g) Human Resources (e.g., control IDs HRS-01 through HRS-13)

h) Identity & Access Management (e.g., control IDs IAM-01 through IAM-16)

i) Interoperability & Portability (e.g., control IDs IPY-01 through IPY-04)

j) Infrastructure & Virtualization Security (e.g., control IDs IVS-01 through IVS-09)

k) Logging and Monitoring (e.g., control IDs LOG-01 through LOG-13)

l) Security Incident Management, E-Discovery, and Cloud Forensics (e.g., control IDs SEF-01 through SEF-08)

m) Supply Chain Management, Transparency, and Accountability (e.g., control IDs STA-01 through STA-14)

n) Threat & Vulnerability Management (e.g., control IDs TVM-01 through TVM-10)

o) Universal Endpoint Management (e.g., control IDs UEM-01 through UEM-14)

Thus, in this example, CSA STAR includes a total of 16 groups (or sets) of controls, where each group includes multiple controls, for a total of 178 different controls.

It may be noted that there are occasionally some controls that can be similar to one or more other controls. At times, a control in one set may be similar to a control in another set. Furthermore, as recognized by the present disclosure, some controls in one compliance program (e.g., CSA STAR) may be similar to controls in another compliance program. These similarities have not been previously exploited in other conventional systems. Therefore, the present disclosure is configured to recognize these similarities among one or more different compliance programs and minimize redundancies, combine similar controls into a single control, and organize the controls in certain ways to simplify the overall compliance process. As a result, it has been found that the embodiments of the present disclosure are able to perform the compliance analysis is considerably less time, thereby reducing the time and effort needed to determine if a certain product is compliant with existing standards and regulations.

Referring back to FIG. 7, the compliance analyzing system 420 includes the collection of compliance controls, as described above, using the collection module 432. These compliance controls that are collected may be stored in the database 424. Also, the list of controls and the descriptions (e.g., specifications) of each control can be forwarded to the compliance control organizing module 434. It is believed that this module, in particular, is not described in conventional systems. Particularly, the compliance control organizing module 434 is configured to organize the controls that have been collected. Again, the number of controls may be in the hundreds in some cases. In some embodiments, the processing module 426 and/or compliance control organizing module 434 may be configured to utilize ML or other AI techniques for organizing the controls in any suitable manner. Again, this organizing process may include the controls obtained from any number of compliance programs that may be applicable. In addition to CSA STAR, other applicable compliance programs, for example, may include the American Institute of Certified Public Accountants (AICPA) programs, such as the System and Organization Control (SOC) 1, SOC 2, SOC 3, etc. Other programs may include the International Standardization Organization (ISO) 27001, 27018, etc. The four compliance programs (i.e., AICPA SOC, ISO 27001, ISO 27018, and CSA STAR) are described below with respect to FIG. 8.

According to some embodiments, the process of organizing the controls (as provided by the compliance control organizing module 434) may include:

a) observing equivalent, similar, or overlapping language (or equivalent, similar, or overlapping definitions of words) that are used in the controls of the one or more compliance programs;

b) removing redundant controls;

c) consolidating or grouping similar or overlapping controls;

d) ordering or rearranging the controls in a logical progression or sequence based on similarities in the different controls;

e) and/or other functions.

In this way, the number of controls may be significantly reduced, and the related controls may be combined, reordered, etc. in order to simplify the processing of each control, which may include human involvement. Therefore, by presenting the controls (for analysis) to a human certifier in a way that reduces confusion and allows the certifier to proceed through the compliance process in a logical fashion, the time needed by the certifier to perform compliance can be significantly reduced, as explained below with respect to FIGS. 8 and 9.

Particularly, after organizing the controls, as described with respect to the compliance control organizing module 434, the compliance analyzing system 420 is configured to store the defragmented and organized controls in the database 424 and/or replace controls accordingly. Also, the consolidated controls (with the particular ordering) are forwarded to the audit module 436. As illustrated, the audit module 436 may include a pre-assessment unit 438, an onsite-assessment unit 440, and a post-assessment unit 442. The audit module 436 may be configured to group certain controls in the pre-assessment unit 438 that are related to processing that can be performed before human involvement onsite. For example, some of this pre-processing may include the organization functionality associated with the compliance control organizing module 434. The onsite-assessment unit 440 may be configured to receive the controls that are related to operations associated with testing for compliance at the specific enterprise itself and may be perform by one or more people from a certifying (third party) group and/or from the enterprise. The onsite assessment may include physical observations of systems and test results (e.g., using any type of analysis systems, programs, dashboards, etc.). The post-assessment unit 442 is configured to gather the controls related to compliance functionality performed after the onsite assessment procedures, which may not be significantly different from previous processes. Nevertheless, with the savings of time, effort, and energy that can be attained through the first two stages (pre-assessment and online-assessment), the embodiments of the present disclosure still provide significant advantages over conventional systems.

Furthermore, after the collection of controls in each bin associated with each of the pre-assessment unit 438, onsite-assessment unit 440, and post-assessment unit 442 (e.g., which may be stored in the database 424), the compliance analyzing system 420 is configured to utilize each of the pre-assessment unit 438, onsite-assessment unit 440, and post-assessment unit 442 at the appropriate time, in the predetermine order and organization provided by the compliance control organizing module 434, for testing the security product (or other system or device) for compliance with the applicable laws, standards, regulations, etc. It may be noted that each stage represented by the units 438, 440, 442 may include multiple days of testing, analysis, trials, interviews, demos, etc. for accurately obtaining the results.

Once the multiple-day testing is complete, the results of the assessments by the audit module 436 are provided to the certification module 444. If the security product adheres to the standards and regulations at a satisfactory level, the certification module 444 may be configured to automatically produce a certificate that can be presented to the enterprise regarding their security product, notifying the enterprise that the product is certified with respect to the applicable standards. Of course, this certificate may then be used in the marketing and advertising of the product to inform potential customers that the product complies with the applicable standards.

Furthermore, the certification module 444 may also be configured to create a report for the client (e.g., enterprise) notifying the client of the results of the analysis. Also, the specific details of the evidence used to assess the compliance of each of the controls may also be provided to the client. This may also include recommendations for improvements if one or more controls were not met, were not met completely, or were close to being non-compliant. This information may help the client to address certain issues with their product and to anticipate needed improvement in areas of focus where compliance regulations may be changing or are expected to change in the future.

In some respects, the compliance analyzing system 420 may be referred to as a "Collect Once, Certify All" (COCA) system. For example, the compliance analyzing system 420 may collect all the controls from all of the applicable compliance standards and regulations at the same time.

Then, instead of working through each compliance program one at a time, the compliance analyzing system 420 is configured to provide certification for all the applicable compliance standards in one report. That is, the compliance analyzing system 420 is configured to overcome the deficiencies of the conventional systems by 1) eliminating redundant controls that may be present in different compliance standards, 2) proceeding through the tests and interviews in a logical and sequential manner to reduce the need of the administrators of the enterprise to hop from one subject (or location) to the next and revisiting the same subject (or location) for the next standard, 3) rephrasing the language of similar controls to allow each subject to be addressed more efficiently, without repetition or confusion, and enable the interviewee to test or demo the controls in a clear and understandable sequence, 4) providing a strategic chronology to allow the testers to walk through the procedures in a logical and meaningful way. For example, the compliance analyzing system 420 can avoid repeating the same or similar controls in different programs, jumping from one subject to another, etc.

The compliance analyzing system 420 may be configured to certify to some new compliance request that has multiple controls. Again, each control can be indexed by a control ID. By this analysis, the compliance analyzing system 420 is configured to show when a network service is compliant and provide evidence that the service meets each control. The compliance analyzing system 420, as mentioned above, may be part of the cloud-based system 100 and can show compliance to existing and/or new compliance requirements.

FIG. 8 is a table 450 showing details of performing compliance analysis using conventional strategies. The table 450 shows four compliance programs that are performed individually according to conventional systems. These compliance programs, in this example, include AICPA SOC, ISO 27001, ISO 27018, and CSA STAR. Also, as shown in the table 450, AICPA SOC has an area of focus that includes security, availability, and confidentiality and includes 186 controls. ISO 27001 has an area of focus that includes information security management systems and includes 171 controls. ISO 27018 has an area of focus that includes privacy in the cloud and includes 36 controls. CSA STAR has an area of focus that includes Level 2 certification and includes 354 controls.

Again, according to the conventional manner of performing compliance tests, each compliance program is executed independently and involves starting the process from scratch. Furthermore, the table 450 shows the assessment time (in hours) of the pre-assessment processes, onsite processes, and post-assessment processes. As one example, the AICPA SOC compliance test normally requires 93 hours (i.e., man hours or work hours) to complete the pre-assessment, 60 hours to complete the onsite assessment, and 25 hours to complete the post-assessment, which totals 178 hours. After this test, the compliance testing company may then go on to the next compliance (e.g., ISO 27001) and start the testing for this program. As shown, the total amount of time to complete all four compliance programs is 503 hours.

FIG. 9 is a table 460 that compares the conventional procedures with the systems and methods described in the present disclosure. That is, the conventional approach requires 247 hours to perform the pre-onsite assessment for the four compliance programs (as shown in FIG. 8), 178 hours to perform the onsite assessment, and 78 hours to perform the post-onsite assessment. On the other, the table 460 also shows the benefit of time-savings of the embodiments of the present disclosure. That is, the new approach, according to the systems and methods described herein, are able to perform the pre-onsite assessment in 160 hours, which is a time reduction of about 35% with respect to the conventional systems. The onsite assessment of the present disclosure can be performed in 105 hours, which is a time reduction of about 40% with respect to the conventional systems. The post-onsite assessment of the present disclosure requires about the same amount of time as the conventional process.

The compliance analyzing system 420, according to some embodiments, may be referred to as a "Collect Once, Certify All" system, whereby the controls of all applicable compliance programs (e.g., the compliance programs listed in FIG. 8) are collected in one database, organized by the compliance control organizing module 434 to reduce redundancies and perform other sequencing functions and clarification functions that might otherwise require gathering the same or similar information from personnel or computing systems for each of the individual compliance programs. Then, certification for all the tested compliance programs can be offered in one report or all at the same time, which again can reduce processing times by employees and systems.

In some embodiments, the database 424 can be pre-populated with responses and evidence for controls. When a new compliance request is received at the input interfacing unit 428, the compliance analyzing system 420 may be configured to match the controls with already existing responses. The database 424 can store the information at different stages as needed and may be used for performing a lookup process. The audit module 436 may give instructions for personnel or may perform automated analysis for assessing the controls at each of the three stages of pre-onsite assessment, onsite assessment, and post-onsite assessment. Then, if the product (or online service) is determined to meet the multiple standards, the certification module 44 is configured to automatically produce a document showing certification, which can be automatically supplied to a computing system associated with an administrator or director of the business whose products or services are being tested for compliance. Also, the reports offered by the certification module 44 may include the controls being tested, alterations of the controls being tested, controls deemed to be redundant, control IDs, evidence of each step of the control analysis, etc. The reports may be presented in any suitable form (e.g., PDFs).

In some cases, new compliance requests may be based on new standards having new controls. As such, the compliance analyzing system 420 may be configured to search for and retrieve these control, gather evidence for compliance, and add any new information to the database 424. The compliance analyzing system 420 may periodically refresh the database 424. For example, the compliance controls, evidence, etc. may be updated on a monthly or yearly basis.

The output from the certification module 44, first of all, may include a summary document. Another document may include details of the evidence. The output may be encrypted and password-protected in some embodiments. Also, the documents may also be protected against being edited, prevented from being printed, or protected in other ways.

The processing module 426 and/or compliance control organizing module 434 may include ML/AI for performing data matching between controls in the database 424 from one or more other compliance programs and the controls associated with the new compliance request. This can be performed automatically to avoid the necessity of manually matching new control requests with entries in the database 424. For example, in some embodiments, the matching procedures may use Term Frequency-Inverse Document Frequency (TF-IDF) to match requests to entries in the database 424. Also, feedback from a human user (e.g., supervised learning) may also be received in the compliance analyzing system 420 and used to improve the optimization processes for matching one control with another.

Compliance Analyzing Method

FIG. 10 is a flow diagram illustrating an embodiment of a method 470 for performing automated compliance analysis. The method 470 may be performed, for example, by the compliance analyzing system 420 or other network system or device that is configured to access compliance standards and receive requests for compliance testing. As shown in FIG. 10, the method 470 includes the step of receiving a request to perform a compliance analysis on a cloud-based service to determine whether the cloud-based service complies with multiple compliance standards applicable to an environment in which the cloud-based service is intended to operate, as indicated in block 472. The method 470 further includes the step of collecting compliance controls associated with each of the multiple compliance standards, as indicated in block 474. Also, the method 470 is configured to automatically organize the compliance controls to reduce the number of assessment steps, as indicated in block 476. The method 470 further includes enabling implementation of one or more assessment stages using the reduced number of assessment steps to determine whether the cloud-based service complies with the multiple compliance standards, as indicated in block 478.

For example, the step of automatically organizing the compliance controls (block 476) may include a) recognizing similarities or equivalents among one or more different compliance controls, b) analyzing similar language among one or more different compliance controls, c) removing redundancies in the compliance controls, d) combining, grouping, or consolidating similar compliance controls, and/or e) rearranging an order of the compliance controls in a logical sequence to simplify the overall compliance process.

The method 470 of FIG. 10 may also include additional steps according to other embodiments. For example, the method 470 may further comprise the step of pre-populating a database with the compliance controls associated with each of the multiple compliance standards. The method 470 may also retrieve data associated with a new compliance standard and store new compliance controls of the new compliance standard in the database. For example, the one or more assessment stages (block 478) may include a) a pre-onsite assessment, b) an onsite assessment, and c) a post-onsite assessment.

The method 470 may also include the step of creating a report that includes results of the compliance analysis. The report, for instance, may include a) a certification, b) a document explaining results of the compliance analysis, and/or c) a document providing details showing evidence of compliance to the compliance controls. The cloud-based service described herein may be a network security service. The compliance standards may be related to industry standards, federal government standards, and/or state government standards. Also, the method may further include the step of selecting the multiple compliance standards based on one or more specific geographical areas where a service provider of the cloud-based service is intended to do business.

CONCLUSION

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections include headers for various embodiments and those skilled in the art will appreciate these various embodiments may be used in combination with one another as well as individually.

What is claimed is:

1. A method performed by a compliance analyzing system comprising at least one processor and a memory storing instructions executable by the processor, the method comprising:

receiving, via an input interfacing unit, a request to perform a compliance analysis on a cloud-based service to determine whether the cloud-based service complies with multiple compliance standards applicable to an environment in which the cloud-based service is intended to operate;

collecting, by a collection module, compliance controls associated with each of the multiple compliance standards and storing the compliance controls in a compliance database;

automatically organizing, by a compliance control organizing module utilizing machine learning techniques, the compliance controls by (i) recognizing similarities or equivalents among compliance controls from different compliance standards, (ii) consolidating or grouping overlapping controls, and (iii) rearranging an order of the compliance controls in a logical sequence to reduce redundancies and thereby reduce a number of assessment steps;

enabling, by an audit module, implementation of multiple assessment stages including at least a pre-onsite assessment, an onsite assessment, and a post-onsite assessment using the reduced number of assessment steps to determine whether the cloud-based service complies with the multiple compliance standards; and generating, by a certification module, a compliance report including evidence of compliance across the multiple compliance standards.

2. The method of claim 1, further comprising pre-populating a database with the compliance controls associated with each of the multiple compliance standards.

3. The method of claim 2, further comprising retrieving data associated with a new compliance standard and storing new compliance controls of the new compliance standard in the database.

4. The method of claim 1, wherein automatically organizing the compliance controls further comprises analyzing similar language among the compliance controls using natural language processing and removing redundancies by consolidating overlapping compliance requirements.

5. The method of claim 1, wherein the multiple assessment stages include a pre-onsite assessment that groups related controls and pre-populates the compliance database with evidence prior to human review, an onsite assessment that includes physical observation of systems, interviews, or demonstrations to validate compliance, and a post-onsite assessment that compiles final compliance results for certification.

6. The method of claim 1, further comprising creating a report that includes results of the compliance analysis.

7. The method of claim 6, wherein the report includes one or more of a) a certification, b) a document explaining results of the compliance analysis, and c) a document providing details showing evidence of compliance to the compliance controls.

8. The method of claim 1, wherein the cloud-based service is a network security service.

9. The method of claim 1, wherein the multiple compliance standards are related to one or more of industry standards, federal government standards, and state government standards.

10. The method of claim 1, further comprising selecting the multiple compliance standards based on one or more specific geographical areas where a service provider of the cloud-based service is intended to do business.

11. A cloud-based system comprising:

a processor; and a memory in communication with the processor, the memory configured to store logical instructions which, when executed, allow the processor to receive, via an input interfacing unit, a request to perform a compliance analysis on a cloud-based service to determine whether the cloud-based service complies with multiple compliance standards applicable to an environment in which the cloud-based service is intended to operate, collect, by a collection module, compliance controls associated with each of the multiple compliance standards and store the compliance controls in a compliance database, automatically organize, by a compliance control organizing module utilizing machine learning techniques, the compliance controls by (i) recognizing similarities or equivalents among compliance controls from different compliance standards, (ii) consolidating or grouping overlapping controls, and (iii) rearranging an order of the compliance controls in a logical sequence to reduce redundancies and thereby reduce a number of assessment steps, enable, by an audit module, implementation of multiple assessment stages including at least a pre-onsite assessment, an onsite assessment, and a post-onsite assessment using the reduced number of assessment steps to determine whether the cloud-based service complies with the multiple compliance standards; and generate, by a certification module, a compliance report including evidence of compliance across the multiple compliance standards.

12. The cloud-based system of claim 11, further comprising a database, wherein the logical instructions further allow the processor to pre-populate the database with the compliance controls associated with each of the multiple compliance standards, retrieve data associated with a new compliance standard, and store new compliance controls of the new compliance standard in the database.

13. The cloud-based system of claim 11, wherein automatically organizing the compliance controls further comprises analyzing similar language among the compliance controls using natural language processing and removing redundancies by consolidating overlapping compliance requirements.

14. The cloud-based system of claim 11, wherein the multiple assessment stages include a pre-onsite assessment that groups related controls and pre-populates the compliance database with evidence prior to human review, an onsite assessment that includes physical observation of systems, interviews, or demonstrations to validate compliance, and a post-onsite assessment that compiles final compliance results for certification.

15. The cloud-based system of claim 11, wherein the logical instructions further allow the processor to create a report that includes results of the compliance analysis, wherein the report includes one or more of a) a certification, b) a document explaining results of the compliance analysis, and c) a document providing details showing evidence of compliance to the compliance controls.

16. A non-transitory computer-readable medium having logical instructions for enabling one or more processing devices to:

receive, via an input interfacing unit, a request to perform a compliance analysis on a cloud-based service to determine whether the cloud-based service complies with multiple compliance standards applicable to an environment in which the cloud-based service is intended to operate;

collect, by a collection module, compliance controls associated with each of the multiple compliance standards and store the compliance controls in a compliance database;

automatically organize, by a compliance control organizing module utilizing machine learning techniques, the compliance controls by (i) recognizing similarities or equivalents among compliance controls from different compliance standards, (ii) consolidating or grouping overlapping controls, and (iii) rearranging an order of the compliance controls in a logical sequence to reduce redundancies and thereby reduce to reduce a number of assessment steps;

enable, by an audit module, implementation of multiple assessment stages including at least a pre-onsite assessment, an onsite assessment, and a post-onsite assessment using the reduced number of assessment steps to determine whether the cloud-based service complies with the multiple compliance standards; and generate, by a certification module, a compliance report including evidence of compliance across the multiple compliance standards.

17. The non-transitory computer-readable medium of claim 16, wherein automatically organizing the compliance controls further comprises analyzing similar language among the compliance controls using natural language processing and removing redundancies by consolidating overlapping compliance requirements.

18. The non-transitory computer-readable medium of claim 16, wherein the cloud-based service is a network security service.

19. The non-transitory computer-readable medium of claim 16, wherein the multiple compliance standards are related to one or more of industry standards, federal government standards, and state government standards.

20. The non-transitory computer-readable medium of claim 16, further comprising selecting the multiple compliance standards based on one or more specific geographical areas where a service provider of the cloud-based service is intended to do business.

* * * * *